(12) United States Patent
Okuda

(10) Patent No.: US 6,938,190 B2
(45) Date of Patent: Aug. 30, 2005

(54) FAILURE DETECTOR FOR COMMUNICATION NETWORK IN AUTOMOBILE

(75) Inventor: Kazuyuki Okuda, Chiryu (JP)

(73) Assignee: DENSO Corporation, Kariya (JP)

( * ) Notice: Subject to any disclaimer, the term of this patent is extended or adjusted under 35 U.S.C. 154(b) by 478 days.

(21) Appl. No.: 09/953,142

(22) Filed: Sep. 17, 2001

(65) Prior Publication Data

US 2002/0062460 A1 May 23, 2002

(30) Foreign Application Priority Data

Nov. 17, 2000 (JP) ........................................ 2000-351179

(51) Int. Cl.⁷ .............................................. G06F 11/00
(52) U.S. Cl. ......................................... 714/55; 701/31
(58) Field of Search ................................ 714/4, 47, 48, 714/55, 56; 701/31

(56) References Cited

U.S. PATENT DOCUMENTS

| | | | |
|---|---|---|---|
| 4,410,938 A | * 10/1983 | Higashiyama | 714/47 |
| 5,390,326 A | * 2/1995 | Shah | 370/222 |
| 5,499,336 A | 3/1996 | Preis et al. | 714/4 |
| 5,572,658 A | 11/1996 | Mohr et al. | 714/4 |
| 5,987,365 A | * 11/1999 | Okamoto | 701/29 |
| 6,330,605 B1 | * 12/2001 | Christensen et al. | 709/226 |
| 6,411,606 B1 | * 6/2002 | Moura et al. | 370/282 |
| 6,618,373 B1 | * 9/2003 | Subramaniam | 370/390 |
| 6,728,781 B1 | * 4/2004 | Aguilera et al. | 709/240 |
| 2002/0169861 A1 | * 11/2002 | Chang et al. | 709/223 |

FOREIGN PATENT DOCUMENTS

| | | |
|---|---|---|
| JP | 61-117942 | 6/1986 |
| JP | 04-239239 | 8/1992 |
| JP | 05-327728 | 12/1993 |
| JP | 06-351077 | 12/1994 |
| JP | 07-046666 | 2/1995 |
| JP | 8-98278 | 4/1996 |
| JP | 2000-31988 | 1/2000 |
| JP | 2000-106566 | 4/2000 |

* cited by examiner

*Primary Examiner*—Robert Beausoliel
*Assistant Examiner*—Gabriel L Chu
(74) *Attorney, Agent, or Firm*—Nixon & Vanderhye P.C.

(57) ABSTRACT

A communication network for use in an automobile includes a main electronic control unit (ECU) that communicates with plural sub-ECUs connected to the main ECU through a communication line. Messages transmitted periodically with a certain interval from each sub-ECU to the main ECU and received by the main ECU in a monitoring interval are counted to obtain the number of message receipts. The number of message receipts is compared with a criterion number preset for each sub-ECU, and if the former is smaller than the later, it is determined that the sub-ECU is under failure. Further, if the number of message receipts is smaller than the criterion number as to all of the sub-ECUs, it is determined that there is a failure or failures in the communication line.

18 Claims, 6 Drawing Sheets

FAILURE DETECTOR FOR COMMUNICATION NETWORK IN AUTOMOBILE

CROSS-REFERENCE TO RELATED APPLICATION

This application is based upon and claims benefit of priority of Japanese Patent Application No. 2000-351179 filed on Nov. 17, 2000, the content of which is incorporated herein by reference.

BACKGROUND OF THE INVENTION

1. Field of the Invention

The present invention relates to a device for detecting failures in a communication network of an automotive vehicle, in which plural electronic control units (ECUs) are connected to one another through communication lines.

2. Description of Related Art

Recently, various network systems for use in an automobile, such as CAN (control area network), have been developed. Plural ECUs are interconnected in such a network, and it is required to detect communication failures in the network. Various systems for detecting the communication failures are proposed. For example, JP-A-8-500707 discloses a system in which situations where an ACK message (a message acknowledging receipt of information sent from a sender) is not sent back to a sender are found out, and failures in the network are determined based on such findings. If the communication line in the network is damaged, for example, the ACK message is not sent back to the sender. The failures in the communication line are detected by monitoring the ACK message.

In recent automobile networks, a number of communication modules are connected through a common communication line to handle an increased amount of information and data, and data communication among plural modules is performed. Examples of such networks are briefly shown in FIGS. 6A and 6B. In an example shown in FIG. 6A, an ECU 31 having a communication module 31a is connected to plural ECUs 32, 33 each having each communication module 32a, 33a through a communication line 34. In an example shown in FIG. 6B, an ECU 41 having plural communication modules 41a, 41b is connected to an ECU 42 having a communication module 42a through a communication line 43.

Figure 6A:
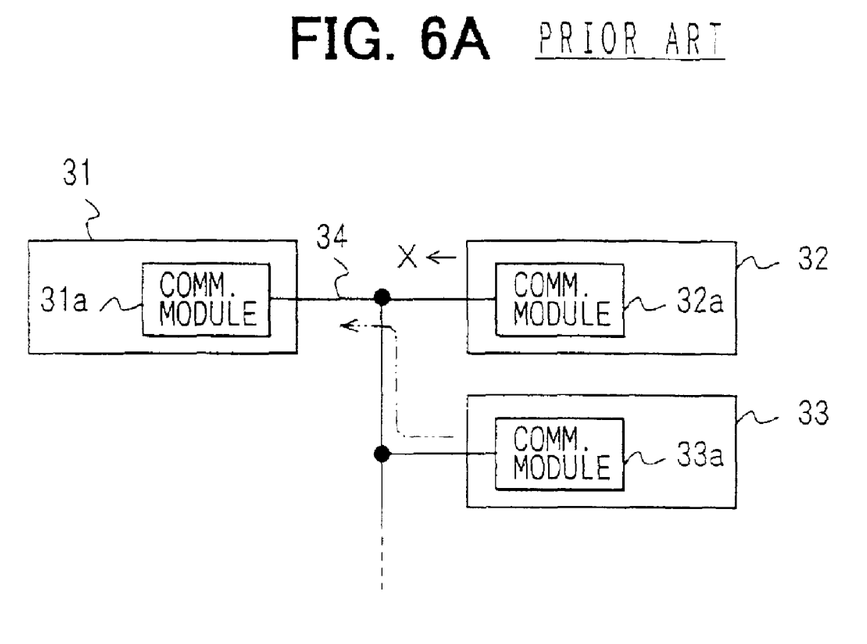
FIGS. 6A and 6B are block diagrams, each showing an example of a conventional automobile network.
Figure 6B:
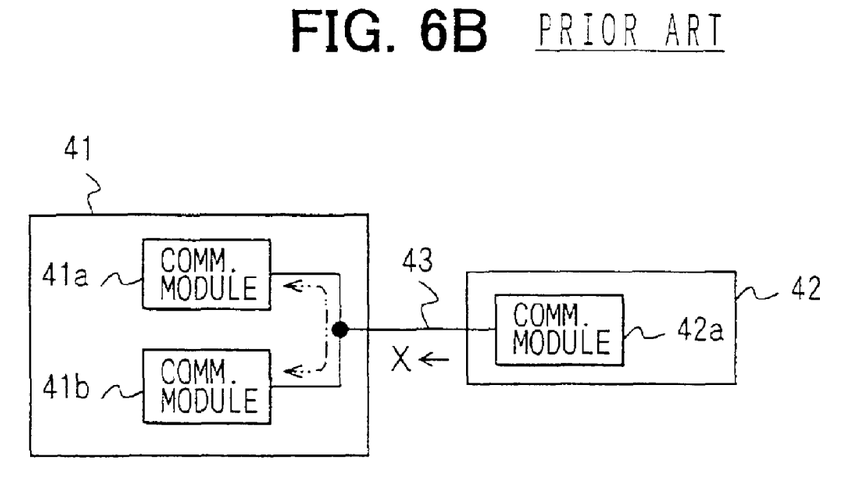

In the network shown in FIG. 6A, if the ECU 32 becomes unable to send back an ACK message to the ECU 31 due to its failure, another ECU 33 sends an ACK message to the ECU 31 in place of the ECU 32 through a dotted line. Therefore, the ECU 31 cannot detect the failure occurred in the ECU 32 according to the conventional failure detection method. In the network shown in FIG. 6B, if the communication line 43 is discontinued, the ACK messages are exchanged between the communication modules 41a and 41b because they are interconnected in the ECU 41. Therefore, the ECU 41 is not able to detect the communication line failure.

SUMMARY OF THE INVENTION

The present invention has been made in view of the above-mentioned problem, and an object of the present invention is to provide a device and a method for properly detecting failures in the automotive network that includes plural electronic control units (ECUs).

In an automobile communication network, a main ECU having a communication module is connected to plural sub-ECUs each having a communication module through a communication line. Each sub-ECU periodically transmits messages with a message-sending interval to the main ECU. The main ECU counts the number of messages received in a monitoring interval which is longer than the message-sending interval. The counting is performed individually for each sub-ECU, and a criterion number is preset for each sub-ECU. The number of messages sent from each sub-ECU and received by the main ECU in the monitoring interval is compared with the criterion number preset for each sub-ECU.

The criterion number is preset to a number which is smaller than a number obtained by dividing the monitoring interval by the message-sending interval. For example, the message-sending interval is set to 8 milliseconds for a particular sub-ECU, and the monitoring interval is set to 64 milliseconds. In this case, the criterion number for that particular sub-ECU is set to 6 which is smaller than 8 (8=64/8). If the number of message receipts from that sub-ECU in the monitoring interval is smaller than the criterion number, it is determined that a failure or failures are involved in that particular sub-ECU. If, as to all of the sub-ECUs, the number of message receipts is smaller than the respective criterion number, it is determined that there occurred a failure in the communication line connecting the main ECU to the sub-ECUs.

The number of message receipts from each sub-ECUs may be summed up to obtain a total number of message receipts, and the total number of message receipts may be compared with a second criterion number. If the total number of message receipts is smaller than the second criterion number, it is determined that a failure or failures occurred in the communication network. The criterion number for each sub-ECU may include plural levels, and the number of message receipts may be compared with each of the plural levels to specify kinds of failures occurred in the communication network. The main ECU may include plural communication modules interconnected to one another, and the interconnected plural modules may communicate with each of the communication modules included in the sub-ECUs.

According to the present invention, which one of the sub-ECUs is under failure and whether the communication line involves failures are easily and effectively detected.

Other objects and features of the present invention will become more readily apparent from a better understanding of the preferred embodiment described below with reference to the following drawings.

DETAILED DESCRIPTION OF THE PREFERRED EMBODIMENT

Figure 1:
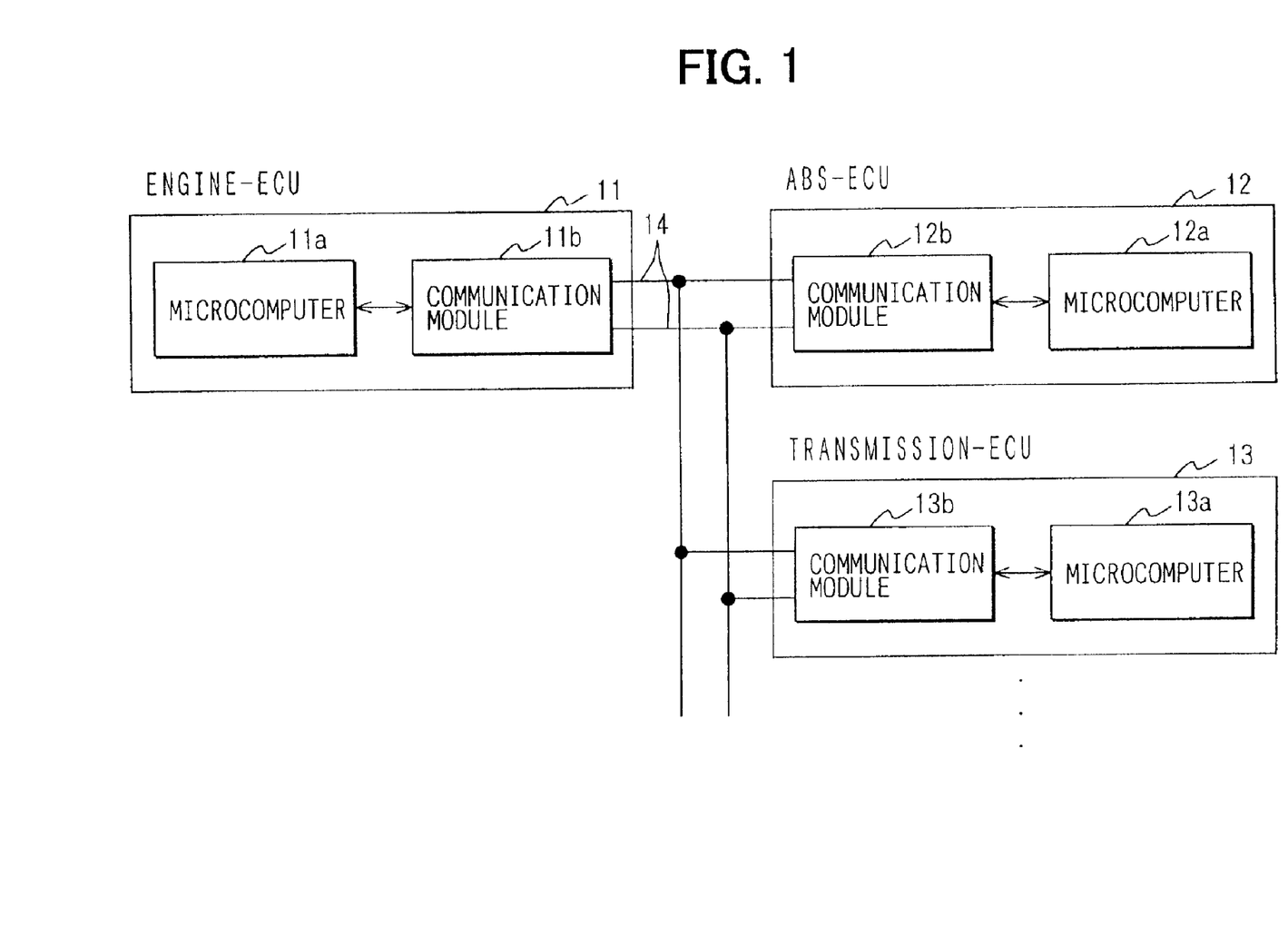
FIG. 1 is a block diagram showing a network used in an automobile vehicle.

A preferred embodiment of the present invention will be described with reference to FIGS. 1–4. FIG. 1 shows an outline of a communication network in an automotive vehicle. A main ECU (an electronic control unit) 11 and plural sub-ECUs 12, 13 . . . are included in the network. The main ECU 11 is an engine-ECU that controls fuel injection and ignition timing for an internal combustion engine of the vehicle. The sub-ECU 12 is an ABS-ECU that controls a braking oil pressure of an anti-block brake system, and the sub-ECU 13 is a transmission-ECU that controls an automatic transmission. The sub-ECUs 12, 13 are connected to the main ECU 11 through common communication lines 14 for sending and receiving information and data. Some more sub-ECUs may be connected to the main ECU 11 in addition to the sub-ECUs 12 and 13.

The main ECU 11 includes a communication module 11b communicating with other communication modules 12b, 13b included in the sub-ECUs 12, 13. Each communication module 11 b, 12b, 13b is composed of a CAN-IC (a control area network integrated circuit). Each ECU 11, 12, 13 also includes a respective microcomputer 11a, 12a, 13a that performs a respective function. Information and data concerning engine operations and driving conditions are communicated and exchanged among the ECUs 11, 12, 13. The ABS-ECU 12 and the transmission-ECU 13 periodically send messages to the engine-ECU 11, respectively. The engine-ECU 11 detects failures in the sub-ECUs 12, 13 and in the communication line 14 based on receipt of the messages from the sub-ECUs 12, 13. For example, the ABS-ECU 12 periodically sends information concerning a vehicle speed and diagnosis data of the ABS system to the engine-ECU 11, and the transmission-ECU 13 sends information concerning gear-shift positions of the transmission and its diagnosis data.

Figure 2A:
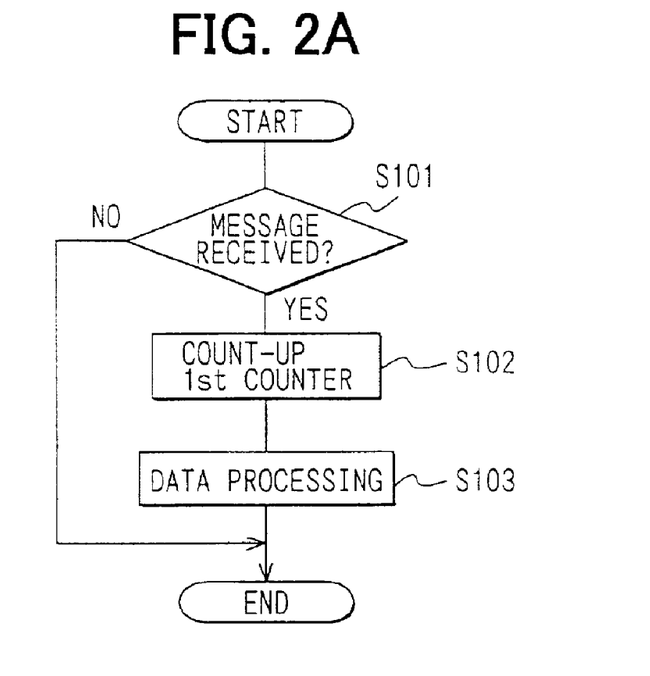
FIG. 2A is a flowchart showing a process for counting the number of receipts of a message sent form a sub-ECU.
Figure 2B:
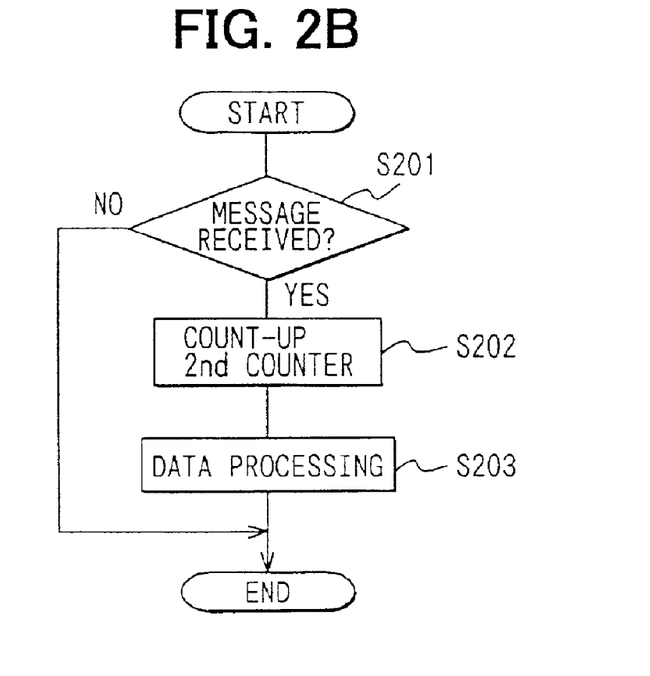
FIG. 2B is a flowchart showing a process for counting the number of receipts of a message sent from another sub-ECU.

A failure detection process according to the present invention will be described with reference to FIGS. 2A, 2B and 3. The main ECU 11 periodically receives messages sent from the sub-ECUs 12, 13 and detects failures based on the number of message receipts. The number of the message receipts is counted in a process shown in FIGS. 2A and 2B. FIG. 2A shows the process of counting the messages sent from the sub-ECU 12 (ABS-ECU), and FIG. 2B shows the process of counting the messages sent from the sub-ECU 13 (transmission-ECU). The process of counting the message receipts is performed every 4 ms (milliseconds) in the main ECU 11. The sub-ECU 12 sends the messages every 8 ms (with a message-sending interval of 8 ms), and the sub-ECU 13 every 5 ms (with a message-sending interval of 5 ms).

In the process shown in FIG. 2A, at step S101, whether a message is received from the sub-ECU 12 is checked. If the message is received, a first counter counts up by one count at step S102. At step S103, data included in the received message are processed and memorized in a memory. If no message is received at step S101, the process proceeds to the end of the process. Similarly, in the process shown in FIG. 2B, whether a message is received from the sub-ECU 13 is checked at step S201. If the message is received, a second counter counts up by one count at step S202. At step S203, data included in the received message are processed and memorized in a memory. If no message is received at step S201, the process proceeds to the end of the process.

Figure 3:
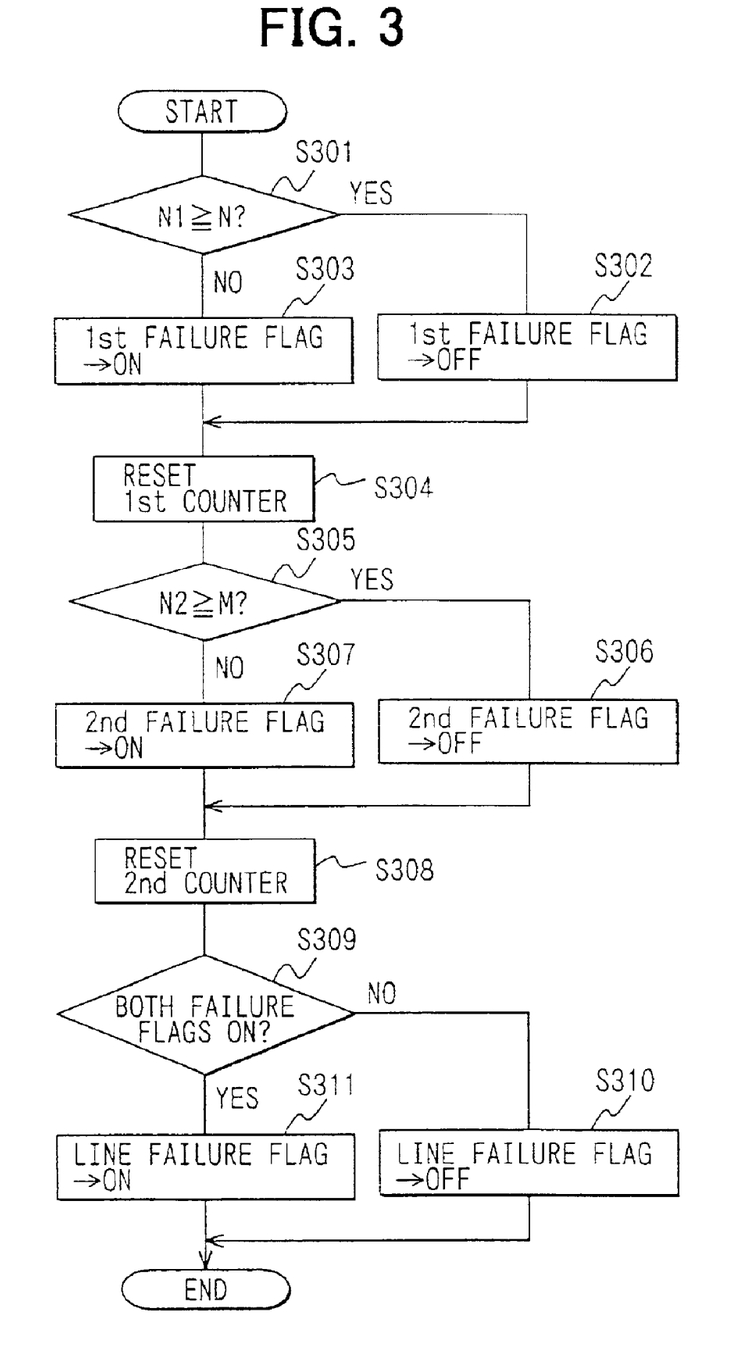
FIG. 3 is a flowchart showing a process for detecting failures in the network based on the number of message receipts counted in the process shown in FIGS. 2A and 2B.

FIG. 3 shows a process of detecting failures in the network based on the number of message receipts counted in the processes shown in FIGS. 2A and 2B. This process is performed in the main ECU 11 every 64 ms (with a monitoring interval of 64 ms) which is longer than the intervals of sending messages from the sub-ECUs 12 and 13. Upon starting the failure detecting process, at step S301, whether the number N1 of message receipts from the sub-ECU 12 during a previous 64 ms period is equal to or larger than a first criterion number N is determined (N1≧N?). The first criterion number N is set to a number which is smaller than a number obtained by dividing the monitoring interval (64 ms) by the message-sending interval of the sub-ECU 12 (8 ms). That is, N<64/8=8. In this particular embodiment, N is set to 6.

If it is determined that N1>N at step S301, the process proceeds to step S302, where a first failure flag that indicates failures in communication with the sub-ECU 12 is turned off. This is because the communication with the sub-ECU 12 is considered as being properly performed if N1 exceeds the first criterion number N. On the other hand, if N1<N, the process proceeds to step S303, where the first failure flag is turned on, because it is considered that the communication with the sub-ECU 12 is improper under this situation. Then, at step S304, the first counter is reset to be prepared for detection in the next monitoring period.

Then, at step S305, whether number N2 of message receipts from the sub-ECU 13 during a previous 64 ms period is equal to or larger than a second criterion number M is determined (N2≧M?). The second criterion number M is set to a number which is smaller than a number obtained by dividing the monitoring interval (64 ms) by the message-sending interval of the sub-ECU 13 (5 ms). That is, M<64/5=12.8. In this particular embodiment, M is set to 11. If it is determined that N2≧M at step S305, the process proceeds to step S306, where a second failure flag that indicates failures in communication with the sub-ECU 13 is turned off. This is because the communication with the sub-ECU 13 is considered as being properly performed if N2 exceeds the second criterion number M. On the other hand, if N2<M, the process proceeds to step S307, where the second failure flag is turned on, because it is considered that the communication with the sub-ECU 13 is improper under this situation. Then, at step S308, the second counter is reset to be prepared for detection in the next monitoring period.

Then, at step S309, whether both of the first and second failure flags are turned on is determined. If both failure flags are turned on, the process proceeds to step S311, where a line failure flag is turned on, because it is considered that the common communication line 14, through which both sub-ECUs 12, 13 communicate with the main ECU 11, is under failure or disconnected in this situation. If the answer of step S309 is NO, i.e., both failure flags are off, or either one of them is off, the line failure flag is turned off at step S310.

The failure detection process described above will be further explained with reference to FIG. 4 that shows timing of each step. In the timing chart, a failure detection process starts at t1, and the next failure detection process starts at t2. The interval between t1 and t2 is the monitoring interval, which is 64 ms in this embodiment. The common communication line 14 is supposed to be disconnected at ta. The message-sending interval of the sub-ECU 12 is set to 8 ms, and that of the sub-ECU 13 is set to 5 ms. Therefore, if on failure is involved in the network, the main ECU 11 receives a message from the sub-ECU 12 in every 8 ms, and a message from the sub-ECU 13 in every 5 ms. The process of counting the message shown in FIGS. 2A and 2B is performed every 4 ms, and the number of the message receipts is monitored with the monitoring interval of 64 ms.

Figure 4:
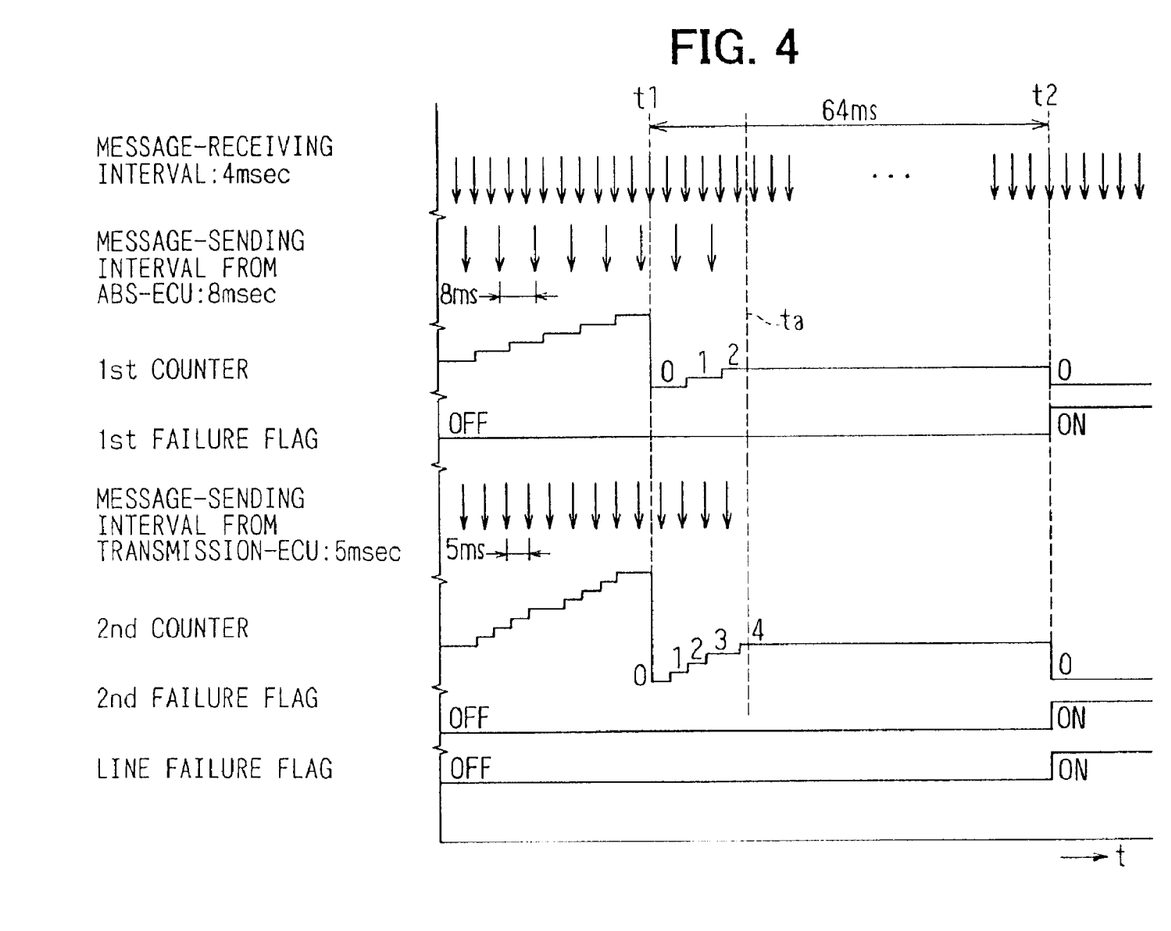
FIG. 4 is a timing chart showing time sequences in the process for detecting failures in the network.

In the timing chart of FIG. 4, it is supposed that no failure is involved in the network including all the ECUs and the communication lines up to time t1. The first and the second counter count up the number of message receipts, respectively, up to time t1. At time t1, it is determined that the number of message receipts N1 from the sub-ECU 12 is higher than the first criterion number N (N is set to 6 in this embodiment). Similarly, at time t1, it is determined that the number of message receipts N2 from the sub-ECU 13 is higher than the second criterion number M (M is set to 11 in this embodiment). Accordingly, all of the first and second failure flags and the line failure flag are kept turned off, and the first and second counters are reset to zero at time t1.

At time t1, both counters resume again the counting-up operation. At time ta, the common communication line 14 is disconnected due to its failure, and the communication between the main ECU 11 and the sub-ECUS 12, 13 is discontinued. Accordingly, the messages from the sub-ECUs 12, 13 cannot be received by the main ECU 11, and thereby the counting-up operation of both counters is discontinued during a period between ta and t2. Therefore, at time t2, the number of message receipts N1 from the sub-ECU 12 is lower than the first criterion number N, and the number of message receipts N2 from the sub-ECU 13 is lower than the second criterion number M. For example, N1 is 2 which is lower than N (=6), and N2 is 4 which is lower than M (=11). At time t2, the first and second failure flags are turned on, and thereby the line failure flag is turned on. That is, it is determined that the common communication line 14 is under failure because the main ECU 11 is not able to communicate with any one of the sub-ECUs 12, 13. When the line failure is detected in this manner, a predetermined fail-safe measure is taken.

On the other hand, if either one of the first and second failure flags is turned on, it is determined that the sub-ECU corresponding to the turned-on failure flag is under failure. It is determined at the same time that the communication line is not under failure. In this situation, a default value is given to the sub-ECU under failure, and a predetermined fail-safe measure is taken.

According to the present invention, failures in the network that includes a main ECU and plural ECUs connected to the main ECU through a common communication line are surely detected based on the number of messages sent from the sub-ECUs and received by the main ECU. Especially, since the number of message receipts is monitored for each sub-ECU, failures in each sub-ECU can be individually detected. Moreover, failures in the common communication line are easily detected based on the fact that the communication between the main ECU and all of the sub-ECUs is not in order. The communication failures are determined by comparing the monitored number of message receipts with the criterion number which is predetermined for each sub-ECU.

Figure 5:
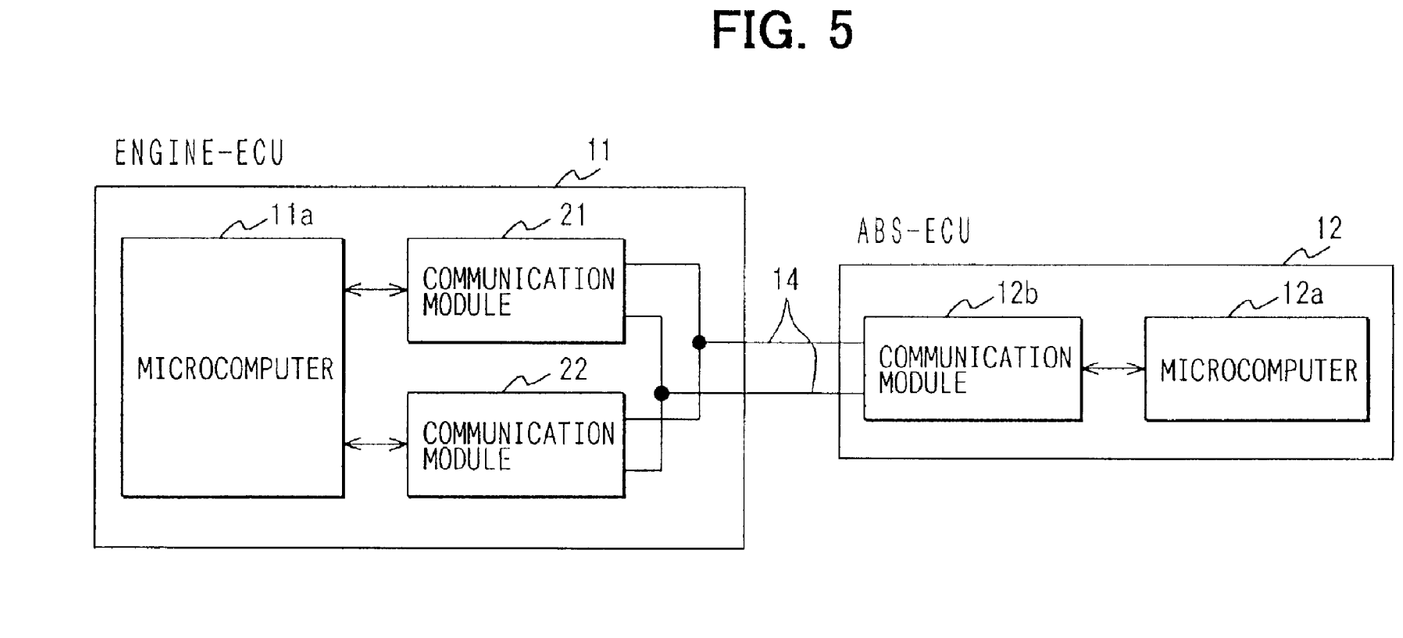
FIG. 5 is a block diagram showing another network used in an automobile.

The present invention is also applicable to the network shown in FIG. 5. The main ECU 11 (engine-ECU) includes plural communication modules 21, 22 interconnected to one another (only two communication modules are shown in FIG. 5). The interconnected plural communication modules 21, 22 communicate with the communication module 12b included in the sub-ECU 12 (ABS-ECU) through the communication line 14. In this network, the main ECU 11 periodically receives messages from the sub-ECU 12 via either one of the communication modules 21, 22, or via both of them. The main ECU 11 counts the number of messages received and monitors the counted number of messages periodically with the monitoring interval, e.g., 64 ms, in the same manner as described above. The monitored number of message receipts is compared with the criterion number, and failures in the network are determined based on the comparison results in the same manner as described above.

The present invention is also applicable to other networks, for example, to a network combining the network shown in FIG. 1 with the network shown in FIG. 5. That is, the present invention is applicable to a network having a main ECU that includes one or more communication modules interconnected and one or more sub-ECUs communicating with the main ECU. The main ECU that detects the failures in the communication network is not limited to the engine-ECU, but it may be other ECUs.

It is also possible to set plural criterion numbers to be compared with the number of message receipts for each sub-ECU. As the first criterion number N for determining the failures in the sub-ECU 12, another criterion number may be set in addition to the originally set criterion number. For example, in the embodiment described above, another criterion number (N=2) may be set in addition to the original one (N=6). In this case, for example, if the number of message receipts N1 is 0 or 1, it is determined that there is a communication line failure, and if N1 is 2–5, it is determined that a processing delay is involved in the sub-ECU 12. By comparing the number of message receipts N1 with the plural criterion numbers, respectively, it is possible to specify kinds of failures involved in the network. The failures can be specified as temporary ones such as a communication delay or as permanent ones such a discontinuation of the communication line.

Though the criterion number is set to a level that is lower than a number obtained by dividing the monitoring interval by the message-sending interval in the embodiment described above (i.e., N is set to 6 that is lower than 64/8, and M is set to 11 that is lower than 64/5), it may be set to a higher level than that. For example, N may be set to 10, and if the number of message receipts N1 is larger than 10, it may be determined that a failure such as malfunction in message-transmission timing occurred.

Further, it is also possible to sum up the number of message receipts from all of the sub-ECUs and to compare the summed-up number with a predetermined criterion number. For example, N1 and N2 are added to obtain a total number which is compared with a criterion number. Failures in the network are properly detected in this manner, too.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A failure detector for a communication network in an automobile, the communication network including a main ECU communicating with a plurality of sub-ECUs through a communication line, the failure detector being included in the main ECU, the failure detector comprising:

means for receiving messages, which are composed of data to be used for controlling functions of the automobile, periodically transmitted from the plurality sub-ECUs with a respectively different message-sending interval predetermined for each sub-ECU;

means for counting number of receipts of the messages from each sub-ECU;

means for periodically monitoring the number of receipts counted in a monitoring interval which is longer than the message-sending interval;

means for comparing the number of receipts counted in a monitoring interval with a criterion number predetermined respectively for each sub-ECU; and means for determining that one of the sub-ECUs is under failure if the number of receipts of the messages from that sub-ECU is smaller than the criterion number predetermined for that sub-ECU.

2. The failure detector as in claim 1, wherein:
the determining means determines that there is a failure in the communication line if the number of receipts counted in the monitoring interval is smaller than the criterion number as to all of the sub-ECUs.

3. The failure detector as in claim 1, wherein:
the criterion number for each sub-ECU is predetermined based on a number obtained by dividing the monitoring interval by the message-sending interval of the sub-ECU.

4. The failure detector as in claim 1, wherein:
the main ECU includes a plurality of communication modules interconnected to one another; and each sub-ECU includes a communication module communicating with the plurality of communication modules in the main ECU.

5. The failure detector as in claim 1, wherein:
the criterion number predetermined for each sub-ECU includes a plurality of levels; and the comparing means compares the number of receipts counted in the monitoring interval with each level of the criterion number to specify kinds of failures involved in the communication network.

6. The failure detector as in claim 1, wherein:
the messages periodically transmitted from the plurality of sub-ECUs to the main ECU are used for controls of the communication network in addition to detecting failures in the communication network.

7. The failure detector as in claim 1, wherein:
a default value is given to the sub-ECU which is determined as being under failure to thereby take a predetermined fail-safe measure.

8. A failure detector for a communication network in an automobile, the communication network including a main ECU communicating with a plurality of sub-ECUs through a communication line, the failure detector being included in the main ECU, the failure detector comprising:

means for receiving messages, which are composed of data to be used for controlling functions of the automobile, periodically transmitted from the plurality of sub-ECUs with a respectively different message-sending interval predetermined for each sub-ECU;

means for counting the number of receipts of the messages from each sub-ECU;

means for periodically monitoring the number of receipts counted in a monitoring interval which is longer than the message-sending interval;

means for calculating a total number of receipts by summing up the number of receipts of the messages from each sub-ECU counted in the monitoring interval;

means for comparing the total number of receipts with a predetermined number; and means for detecting failures in the communication network based on a comparison result of the comparing means.

9. The failure detector as in claim 8, wherein:
the predetermined number includes a plurality of levels; and the comparing means compares the total number of receipts with each level of the predetermined number to specify kinds of failures involved in the communication network.

10. A method of detecting failures in a communication network in an automobile, the communication network including a main ECU communicating with a plurality of sub-ECUs through a communication line, the method comprising:

transmitting messages, which are composed of data to be used for controlling functions of the automobile, periodically with a respectively different message-sending interval that is predetermined for each sub-ECU from the plurality of sub-ECUs to the main ECU;

counting number of receipts of the messages sent from each sub-ECU included in a monitoring interval which is longer than the message-sending interval;

comparing the number of receipts from each sub-ECU included in the monitoring interval with a criterion number predetermined respectively for each sub-ECU;

determining that a failure is involved in a particular sub-ECU if the number of receipts from that sub-ECU is smaller than the criterion number predetermined for that sub-ECU; and further determining that a failure is involved in the communication line if all of the number of receipts from each sub-ECUs are smaller than respective criterion numbers.

11. A method of detecting a failure of a communication network in an automobile, the communication network including a main ECU communicating with a plurality of sub-ECUs through a communication line, the method comprising:

receiving messages, which are composed of data to be used for controlling functions of the automobile, at a failure detector included in the main ECU, the messages being periodically transmitted from the plurality of sub-ECUs with a respectively different message-sending interval predetermined for each sub-ECU;

counting a number of receipts of the messages from each sub-ECU;

periodically monitoring the number of receipts counted in a monitoring interval which is longer than the message-sending interval;

comparing the number of receipts counted in a monitoring interval with a criterion number predetermined respectively for each sub-ECU; and determining that one of the sub-ECUs is under failure if the number of receipts of the messages from that sub-ECU is smaller than the criterion number predetermined for that sub-ECU.

12. The method as in claim 11, further comprising:
determining that there is a failure in the communication line if the number of receipts counted in the monitoring interval is smaller than the criterion number as to all of the sub-ECUs.

13. The method as in claim 11, wherein:
the criterion number for each sub-ECU is predetermined based on a number obtained by dividing the monitoring interval by the message-sending interval of the sub-ECU.

14. The method as in claim 11, wherein:
the criterion number predetermined for each sub-ECU includes a plurality of levels; and the number of receipts counted in the monitoring interval is compared with each level of the criterion number to specify kinds of failures involved in the communication network.

15. The method as in claim 11, wherein:
the messages periodically transmitted from the plurality of sub-ECUs to the main ECU are used for controls of the communication network in addition to detecting failures in the communication network.

16. The method as in claim 11, wherein:
a default value is given to the sub-ECU which is determined as being under failure to thereby take a predetermined fail-safe measure.

17. A method of detecting failure of a communication network in an automobile, the communication network including a main ECU communicating with a plurality of sub-ECUs through a communication line, the method comprising:

receiving messages, which are composed of data to be used for controlling functions of the automobile, at a failure detector included in the main ECU, the messages being periodically transmitted from the plurality of sub-ECUs with a respectively different message-sending interval predetermined for each sub-ECU;

counting the number of receipts of the messages from each sub-ECU;

periodically monitoring the number of receipts counted in a monitoring interval which is longer than the message-sending interval;

calculating a total number of receipts by summing up the number of receipts of the messages from each sub-ECU counted in the monitoring interval;

comparing the total number of receipts with a predetermined number; and detecting failures in the communication network based on a comparison result from a comparison result from comparing the total number of receipts with a predetermined number.

18. The method as in claim 17, wherein:

the predetermined number includes a plurality of levels; and the total number of receipts with each level of the predetermined number is compared to specify kinds of failures involved in the communication network.

* * * * *